(12) United States Patent
Rohee et al.

(10) Patent No.: US 6,402,249 B1
(45) Date of Patent: Jun. 11, 2002

(54) VEHICLE SEAT FITTED WITH A PIVOT MECHANISM

(75) Inventors: René Rohee, Le Cotil; Fabien Le Bourgeois, Flers, both of (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/604,345

(22) Filed: Jun. 27, 2000

(30) Foreign Application Priority Data

Jul. 2, 1999 (FR) .............................. 99 08555

(51) Int. Cl.[7] ................................ B60N 2/02
(52) U.S. Cl. ................... 297/367; 297/378.12
(58) Field of Search ................ 297/367, 368, 297/378.12

(56) References Cited

U.S. PATENT DOCUMENTS

| | | | |
|---|---|---|---|
| 4,502,730 A | 3/1985 | Kazaoka et al. | 297/366 |
| 5,611,599 A | 3/1997 | Baloche et al. | 297/367 |
| 5,820,218 A | 10/1998 | Baloche et al. | 297/367 |
| 6,007,153 A | * 12/1999 | Benoit et al. | 297/378.12 |
| 6,033,022 A | * 3/2000 | Bauer et al. | 297/378.12 |
| 6,068,341 A | * 5/2000 | Rink | 297/378.12 |
| 6,164,723 A | * 12/2000 | Ganot | 297/378.12 |

FOREIGN PATENT DOCUMENTS

| | | |
|---|---|---|
| DE | 33 19 593 | 12/1983 |
| EP | 0 622 267 | 11/1994 |
| EP | 0 694 434 | 1/1996 |
| EP | 0 705 727 | 4/1996 |
| FR | 2 777 234 | 4/1998 |
| GB | 2 218 627 | 11/1989 |

OTHER PUBLICATIONS

French Search Report dated Mar. 6, 2000, French Appl. No. 99 08555.

* cited by examiner

*Primary Examiner*—Jerry Redman
(74) *Attorney, Agent, or Firm*—Marshall, Gerstein, & Borun.

(57) ABSTRACT

The backrest of a seat is linked to the seat part by a pivot mechanism comprising two plates which can be joined by means of toothed bearing plates controlled by a cam. To allow the backrest of the seat to be folded down forwards and this backrest then returned to its initial position, the cam of the pivot mechanism co-operates with an outer indexing mechanism, which comprises a control lever joined to this cam by a mechanical link with a lost motion designed so that operation of the cam will not cause the operating lever to be displaced and so that when the operating lever is operated, the cam will be driven in displacement into its locked position.

10 Claims, 3 Drawing Sheets

VEHICLE SEAT FITTED WITH A PIVOT MECHANISM

FIELD OF THE INVENTION

The present invention relates to vehicle seats fitted with pivot mechanisms.

More specifically, the invention relates to a vehicle seat comprising:

first and second seat elements mounted so as to pivot relative to one another about an axis of rotation, at least one pivot mechanism which comprises a locking device which can be displaced, on the one hand, between a locked position preventing any relative pivoting movement between the first and second seat elements, and, on the other hand, a position that allows a free pivoting movement between the first and second seat elements, this locking device being controlled by a first operating member which can be operated (directly or otherwise) by a user, this first operating member being biased towards a non-operating position in which said first operating member places the locking device in its locked position, and the first operating member being displaceable in an angular operating direction towards an operating position in which said first operating member places the locking device in its unlocked position, the non-operating and activating positions of the first operating member being fixed relative to the first seat element, and an indexing mechanism which is displaceable between, on the one hand, a non-operating position in which said indexing mechanism is designed so as not impair the relative pivoting movement of the first and second seat elements and, on the other hand, an operating position in which said indexing mechanism is designed to:

allow the second seat element to pivot freely relative to the first seat element, in a first angular direction from the last position of relative adjustment of these two seat elements, then allow the second seat element to pivot freely relative to the first seat element, in a second angular direction opposite the first angular direction, as far as said last position of relative adjustment of these two seat elements, the indexing mechanism being controlled by a second operating member which can be operated (directly or otherwise) by a user, this second operating member being biased towards a non-operating position in which said second operating member places the indexing mechanism in its non-operating position, and the second operating member being displaceable into an operating position in which said second operating member places the indexing mechanism in its operating position.

BACKGROUND OF THE INVENTION

Document EP-A-0 694 434 describes a seat of this type, which is designed to be fitted in the front passenger area of vehicles with two side doors and in which the first and second seat elements are the seat part and the backrest of the seat.

This seat known from the prior art is fitted with a pivot mechanism having toothed plates which incorporate the indexing mechanism allowing:

the position of the backrest of the seat to be adjusted, and, in order to gain access to the rear seats of the vehicle for example, the backrest of the seat to be pivoted forward and then automatically re-locked in the position previously adjusted by the user.

The pivot mechanism of this known seat has first and second side plates and toothed plates which are slidably mounted relative to the first side plate and which move so as to engage with a bearing plate which is in turn mobile relative to the second side plate, being joined to this second side plate by means of other toothed plates.

In this case, the two side plates of the pivot mechanism are joined to one another by means of two stages of toothed plates, which tends to reduce the strength of the pivot mechanism or makes it necessary to increase the weight and the cost of this mechanism in order to obtain a high mechanical strength.

Furthermore, the pivot mechanism is a specific mechanism and is produced in quite small batches, making it relatively expensive as compared with a standard pivot mechanism.

OBJECTS AND SUMMARY OF THE INVENTION

The objective of the present invention is to overcome these disadvantages.

To this end, the invention proposes a seat of the type in question, wherein:

the locking mechanism provides a link between the first and second seat elements independently of the indexing mechanism, the indexing mechanism comprises:

an indexing plate not belonging to the locking mechanism, this indexing plate being mounted so as to pivot freely about the axis of rotation independently of the first and second seat elements, a first checking member not belonging to the locking mechanism, this first checking member being linked to the second operating member and to the first seat element so that it can be displaced relative to said first seat element following the second operating member, this first checking member co-operating with the indexing plate in order to lock it relative to the first seat element when the second operating member is in its non-operating position, and the first checking member allowing the indexing plate to pivot freely relative to the first seat element about the axis of rotation when said second operating member is in its operating position, and a second checking member not belonging to the locking mechanism, this second checking member being linked to the second operating member and to the second seat element so that it can be displaced relative to the second seat element following the second operating member, said second checking member co-operating with the indexing plate in order to lock it relative to the second seat element when the second operating member is in its operating position, and the second checking member allow the indexing plate to pivot freely about the axis of rotation relative to the second seat element when the second operating member is in its non-operating position, and, in their non-operating position, the first and second operating members are linked to one another by a lost motion mechanical link which is designed:

to leave the second operating member in its non-operating position when the first operating member is acted on by displacing it into its operating position, and to drive the first operating member from its non-operating position into its operating position when the second operating member is acted on by displacing it from its non-operating position to its operating position.

As a result of these features, when the user of the seat wants to adjust the inclination of the second seat element (for instance the backrest) in order to make himself more comfortable, he operates the first operating member, which releases the pivot mechanism.

Due to the mechanical link providing a lost motion between the first and second operating members and in view of the fact that the two operating members have fixed non-operating and operating positions relative to the same seat element, the second operating element will remain in its non-operating position so that the indexing mechanism is in turn in its non-operating position and does not impair the relative pivoting movement of the first and second seat elements.

On the other hand, when the user of the seat wants to pivot the second seat element rapidly in the first angular direction (when this is the backrest for example, in order to fold this backrest as far forward as possible) he acts on the second operating member, which not only releases the pivot mechanism but also allows the indexing mechanism to shift into its indexing position, restricting the relative pivoting movement of the first and second seat elements so that the second seat element finally returns to its initial position relative to the first seat element.

It should be pointed out that the pivot mechanism of the seat proposed by the invention may be of any standard construction, which means in particular that the same pivot mechanisms can be used for substantially all types of seat which have a backrest which allows the user to act directly on said backrest, regardless of whether this backrest can be folded down towards the front or not in order to gain access to the rear seats of the vehicle.

As a result of this standardization option, the invention brings gains in terms of high productivity and thus an overall reduction in the cost of the seats.

Furthermore, the invention does not require this pivot mechanism to have two stages of bearing plates, enabling a first pivot mechanism to be used which is simple and strong. In any event, the strength of the first pivot mechanism is not dependent on the presence or otherwise of the indexing mechanism.

In preferred embodiments of the invention, one and/or the other of the following features may also be incorporated:

the indexing plate comprises:
an indentation in which the first checking member locates when said first checking member is locked in its non-operating position,
and a circular guide surface centered on the axis of rotation, on which the first checking member slidably bears when the indexing mechanism is in its operating position and the second seat element has been displaced in the first angular direction relative to the first seat element from the last position of relative adjustment;

the indexing plate also has a stop which is adjacent to the indentation of said indexing plate and which is disposed in the first angular direction relative to said indentation, in order to allow a pivoting movement of the second seat element relative to the first seat element only in said first angular direction from said last position of relative adjustment of these two seat elements when the indexing mechanism is in its operating position, and then to check the relative pivoting movement between the first and second seat elements in the second angular direction when the first seat element has been returned to its last position of adjustment relative to the second seat element;

the first checking member is a hook joined to an operating lever which constitutes the second operating lever and which is mounted on the first seat element so as to pivot about an axis parallel with said axis of rotation, the indentation and the guide surface of the indexing plate being radially oriented towards the exterior relative to the axis of rotation;

the first operating member is mounted so as to pivot about the axis of rotation and is joined to an operating lever which is in turn pivotally mounted on a connecting rod joined to the operating lever with some play, the non-operating positions of the first operating member and the operating lever being such that said play is picked up in a direction corresponding to the displacement of the operating lever from its non-operating position to its operating position when the indexing mechanism is in its non-operating position;

the second checking member is coupled with the operating lever by a coupling member pivotally joined to said operating lever (by a pivot, strictly speaking, or by any other linkage means that will allow a certain degree of flexibility, including hooking a flexible cable) at a fixing point which is located substantially on the axis of rotation when the indexing mechanism is in its non-operating position;

the operating lever is joined to a manual operating member which is accessible to a user by means of a coupling member which is in turn pivotally linked to said operating member (by a pivot, strictly speaking, or by any other linkage means that will allow a certain degree of flexibility, including hooking a flexible cable) at a fixing point which is located substantially on the axis of rotation when the indexing mechanism is in its non-operating position;

the second checking member is an indexing bearing plate controlled by a cam mechanically coupled with the second operating member, this cam being mounted on the second seat element so as to pivot about a pivot axis parallel with said axis of rotation, said cam having a circular operating surface centered on said pivot axis, which operating surface holds the indexing bearing plate locked against the indexing plate within a certain angular pivoting range of the cam when the second operating member is in its operating position;

the second checking member is directly coupled with the second operating member by a resilient link;

the first and second seat elements are a seat part and a backrest respectively.

BRIEF DESCRIPTION OF THE DRAWINGS

Other features and advantages of the invention will become clear from the description of two embodiments below, given by way of illustration and not restrictive in any respect, with reference to the appended drawings.

Of the drawings.

MORE DETAILED DESCRIPTION

The same references are used in the different drawings to denote identical or similar elements.

Figure 1:
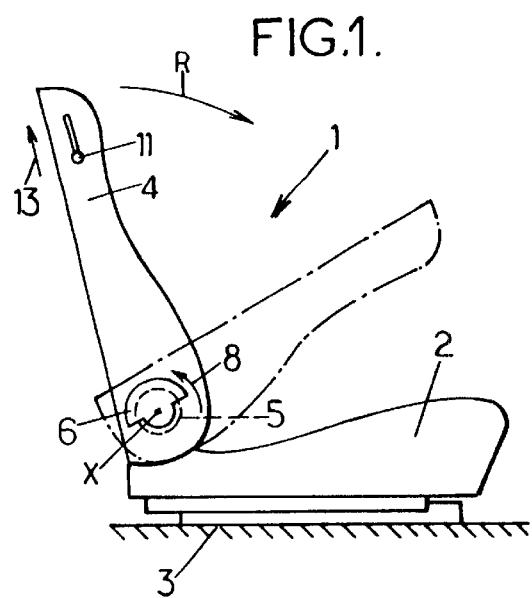
FIGS. 1 and 2 are schematic views from the side and rear respectively of an example of a seat as proposed by the invention.
Figure 2:
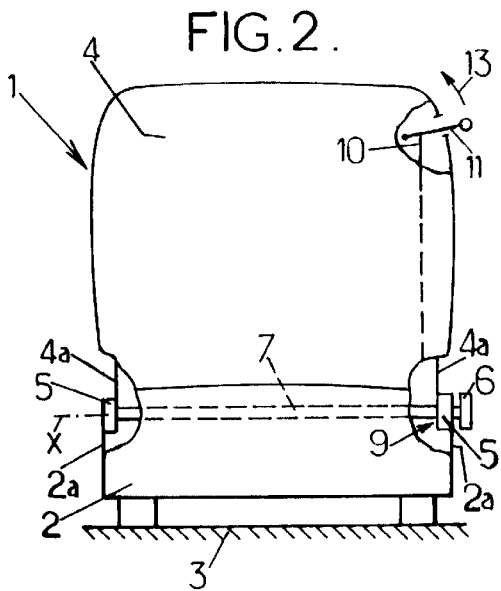

As schematically illustrated in FIGS. 1 and 2, the invention relates to a vehicle seat 1, in particular a front seat of a motor vehicle, comprising on the one hand a seat part 2 mounted on the floor 3 of the vehicle and on the other a backrest 4, mounted on the seat part 2 so as to pivot about a transverse horizontal axis X.

More specifically, the rigid frame 4a of the backrest is joined to the rigid frame 2a of the seat part, at each side of the seat, by two identical or similar pivot mechanisms 5, which are controlled by a same handle 6. This handle is joined to a rigid, metal linking bar 7 which links the two pivot mechanisms 5 to one another and which extends along the axis X. Optionally, the seat may have a pivot mechanism at only one side of the seat, in which case the linking bar 7 would be dispensed with.

When the handle 6 is operated in the angular direction 8 illustrated in FIG. 1, the two pivot mechanisms 5 are simultaneously released so that the user of the seat can adjust the inclination of the backrest 4 by acting directly on this backrest, said backrest generally being biased towards the front by at least one spring (not illustrated).

Furthermore, one of the two pivot mechanisms 5 co-operates with an indexing mechanism 9 which is joined by means of a metal cable 10 or any other mechanical link (a rigid rod, for example), to a lever 11 generally mounted so as to pivot on the backrest 4.

This lever 11 is biased towards a non-operating position by a spring 12, which will be described below, and can be displaced upwards by a user, in the direction of arrow 13.

When the lever 11 is operated in the direction of arrow 13, as will be explained below, the two pivot mechanisms 5 are released, allowing the backrest 4 to be swung as far forward as possible in the direction of the arrow R, to a position illustrated by dotted-dashed lines in FIG. 1.

The indexing mechanism 9 then holds the pivot mechanisms 5 in their unlocked position, even when the lever 11 has been released, until the backrest 4 has been returned to its initial position, i.e. to the last angular position adjusted by the user.

Consequently, the indexing mechanism 9 guarantees that the backrest will not re-lock until it is returned to its initial angular position when folded towards the front and then back again.

The means used to fulfil these functions in the example illustrated here will now be described in more detail below.

Figure 3:
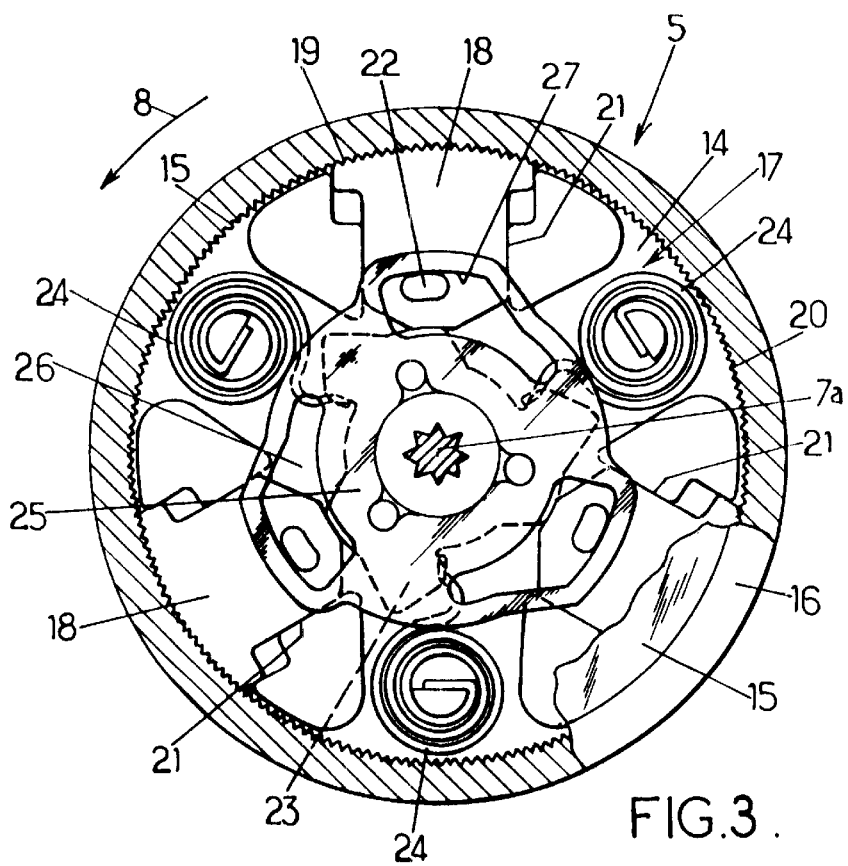
FIG. 3 is a view showing the interior of one of the articulation mechanisms of the seat illustrated in FIGS. 1 and 2.

Firstly, as illustrated in FIG. 3, each of the two pivot mechanisms 5 comprises:

- a fixed metal plate 14, which extends perpendicular to the axis X and which, in the example illustrated, is joined to the rigid frame 2a of the seat part,
- a mobile metal plate 15, which extends perpendicular to the axis X and which, in the example illustrated here, is joined to the frame 4a of the backrest,
- a metal ring 16, which is crimped at the periphery of the fixed and mobile plates, delimiting a closed circular casing therewith,
- and a locking device with bearing plates 17, which is contained in said casing and which is designed to immobilise the mobile plate 15 relative to the corresponding fixed plate 14 as long as the handle 6 is in its non-operating position.

In the example illustrated here, the locking device 17 comprises:

- three metal locking plates 18 which are arranged at 120° from one another and each of which has external teeth 19 designed to engage in internal circular teeth 20 provided on the mobile plate 15, each of these locking plates being mounted so as to be radially slidable in a guide 21, which is joined to the corresponding fixed plate 14 so that the locking plates are displaced between, on the one hand, an engaged position in which the teeth 19 of these locking plates mesh with the teeth 20 of the corresponding mobile plate to lock the pivot mechanism 5, and on the other, a clear position in which the locking plates 18 do not co-operate with the teeth 20 of the mobile plate, each locking plate also having a pin 22 which projects axially towards the mobile plate 15,
- a metal cam 23 or other operating member, which is joined to the linking bar 7 or to a connector fitting 7a joined to said linking bar, in the example illustrated by a nest-fit on splines of said linking bar or said connector fitting,
- springs 24 which are mounted on the fixed plate 14 and which bias the cam 23 towards a non-operating position in which the latter places the locking plates 18 in their engaged position, said cam being able to pivot in the angular direction 8 allowing the locking plates 18 to slide towards their clear position, thereby releasing the pivot mechanism 5,
- and a rigid metal plate 25 which is rigidly linked to the cam 23 and which extends radially between said cam and the mobile plate 15 partially overlapping the locking plates 18, this plate having three cut-out sections 26 in which the pins 22 of the locking plates are engaged, each of these pins co-operating with a cam edge 27 radially delimiting the corresponding cut-out portion towards the exterior and shaped so as to displace the corresponding locking plate radially towards the interior when the cam rotates in the angular direction 8.

Accordingly, the locking plates 18 of the two pivot mechanisms are simultaneously either in their clear position when the corresponding cams 23 are in their non-operating position or in their engaged position when the cams 23, the handle 6 and the linking bar 7 are pivoted from the non-operating position at least along a first angular path α1 in the angular direction 8.

Figure 4:
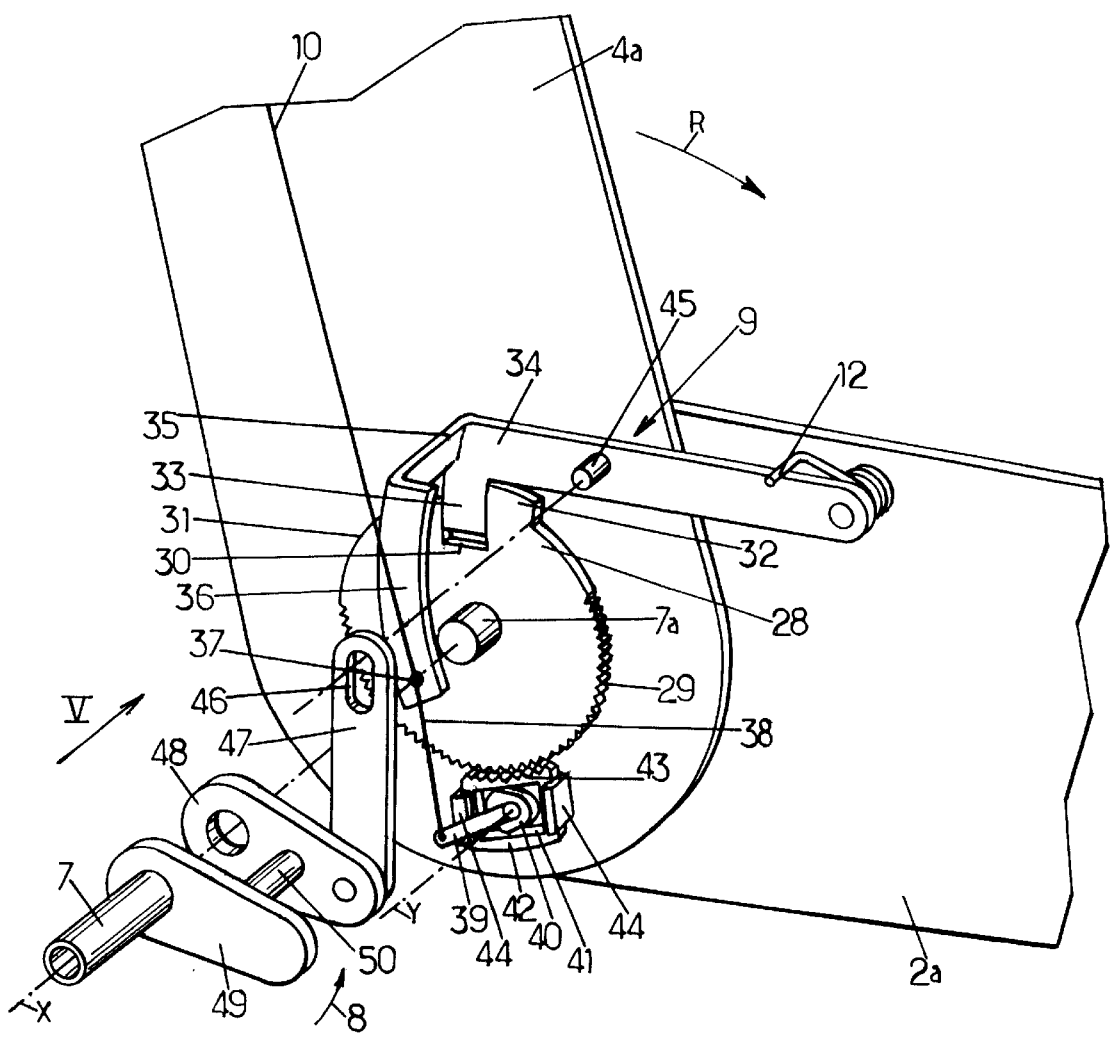
FIG. 4 is an exploded view in perspective of a first embodiment of the indexing mechanism, which may be fitted on the seat illustrated in FIGS. 1 and 2, this mechanism being illustrated in the normal usage position of the seat.
Figure 5:
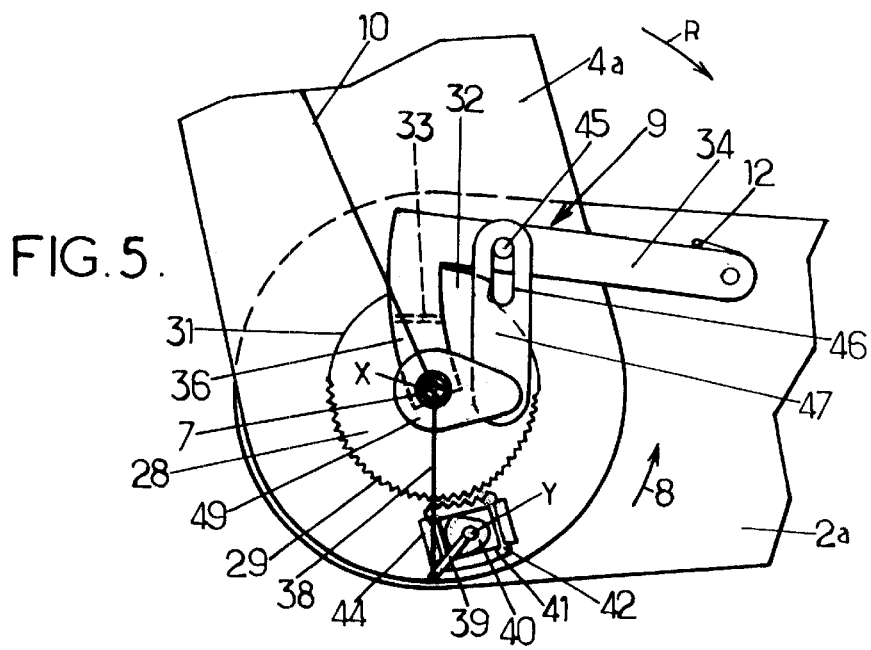
FIGS. 5 and 6 are views along the arrow V of FIG. 4, in the normal position of usage of the seat and in the position in which the backrest folded down, respectively.

Turning to the indexing mechanism 9, we will firstly look at FIGS. 4 and 5, where this mechanism is clearly visible in its non-operating position.

The indexing mechanism 9 comprises an indexing plate 28 provided in the form of a sheet-metal plate extending in a vertical plane perpendicular to the axis X and mounted so as to pivot freely on a cylindrical part of the connector fitting 7a joined to the operating cam of the pivot mechanism 5 located at the side of the lever 11 (this pivot mechanism 5, which is located between the frames 2a and 4a of the seat part and the back rest in the example illustrated here, is not visible in FIGS. 4 and 5).

The pivot plate 28 is of a generally circular shape, centered on the axis X, a part of the periphery of this plate forming circular teeth 29 directed radially towards the exterior and disposed at the bottom in the example illustrated here.

Furthermore, an indentation 30 is also provided on the periphery of the indexing plate 38, in this example open at the top, this indentation being framed by:

- a smooth part of the periphery of the indexing plate 28, forming a circular guide surface 31 in the angular direction opposite the direction R mentioned above,
- and a stop finger 32 projecting radially towards the exterior from the periphery of the indexing plate 28, on the side opposite the guide surface 31.

When the seat is in the normal usage position or the position in which the indexing mechanism 9 is in the non-operating position, the indexing plate 28 is held immobile relative to the frame 2a of the seat part by means of a hook 33 which penetrates the indentation 30, this hook 33 being formed at the free end of a sheet-metal lever 34 mounted so as to pivot on the frame 2a of the seat part about an axis parallel with the axis X.

The lever 34, which constitutes the operating member for the indexing mechanism 9, is resiliently biased in a downward direction by a spring 12 which normally holds the hook 33 engaged in the indentation 30 of the indexing plate.

Furthermore, the lever 34 is extended at a right angle, at its free end, by a linking arm parallel with the axis X, this linking arm 35 being in turn extended at a right angle in a downward direction by a vertical finger 36 having a hooking point 37 at its bottom end, on which the bottom end of the cable 10 linked to the lever 11 is pivotably mounted.

Furthermore, the hooking point 37 is also pivotally joined to a cable 38, which may simply be the extension of the cable 10, which is in turn joined to the free end of a lever 39 joined to a cam 40 mounted on the frame 4a of the backrest so a to pivot about an axis Y parallel with the axis X.

The cam 40 is disposed in a window 41 provided at the interior of a toothed bearing plate 42 which has teeth 43 designed to mesh with the teeth 29 of the indexing plate.

The bearing plate 42 is mounted so as to slide in a radial direction relative to the axis X between guides 44 joined to the frame 4a of the backrest, and this bearing plate is normally located in a clear position, as illustrated in FIGS. 4 and 5, in which the teeth 43 are not meshing with the teeth 29 of the indexing plate.

The bearing plate 42 may be maintained in this clear position simply by virtue of its weight or alternatively by means of a spring (not illustrated) biasing this bearing plate downwards or biasing the cam 40 or the lever 39 into a non-operating position corresponding to the clear position of the bearing plate 42. In a different embodiment, the cable 38 may also be replaced by a substantially rigid linking rod pivotally mounted on the hooking point 37 and at the free end of the lever 39, in which case said lever 39 and the cam 40 are retained in their angular position corresponding to the position in which the bearing plate 42 is clear under the action of the spring 12, which biases the lever 34 downwards.

In all cases, it is of advantage although not absolutely necessary, if the hooking point 37 of the finger 36 is located on a level with the axis X so that the angular adjustments of the backrest 4 do not affect the position of levers 34 and 39 when the indexing mechanism 9 is in the non-operating position.

In addition, the lever 34 also has a pin 45 which is normally disposed at the top end of an oblong aperture 46, in turn provided at the top end of a linking rod 47. The bottom end of this linking rod is mounted so as to pivot on a lever arm 48 which is joined in rotation, with the corresponding connector fitting 7a, to the pivot mechanism 5 adjacent to the indexing mechanism 9. The lever arm 48 is in turn joined to the linking bar 7 by means of an additional lever arm 49 joined to said lever arm 48 by means of a cross-piece 50 which is offset from the axis X, the vertical finger 36 of the lever 34 being disposed between the lever arms 48 and 49.

The device described above operates as follows.

When a user wants to adjust the angular position of the backrest 4, he operates the handle 6 in the angular direction 8, which releases the two pivot mechanisms 5.

During this movement, the lever arm 48 also pivots in the angular direction 8, which raises the linking rod 47 causing the oblong aperture 46 to slide on the pin 45 of the lever 34, without raising said lever 34. As the angular position of the backrest 4 is being adjusted, the indexing plate 48 therefore remains fixed relative to the seat part 2.

If the user wants to fold the backrest 4 forwards in the angular direction R, for example to access the rear seats of the vehicle if it is a motor vehicle with two side doors, this user operates the lever 11 in the direction of arrow 13 (see FIGS. 1 and 2), which raises the lever 34, which lever 34 then drives the linking bar 7 in the angular direction 8 and displaces the lever 39 and the cam 40 towards their angular position corresponding to the operating position of the bearing plate 42, in which the teeth 43 of this bearing plate mesh with the teeth 29 of the indexing plate 28.

The device is designed so that the cam 40 places the indexing bearing plate 42 in an active position before the hook 33 is fully released from the indentation 30 and before the linking bar 7 has displaced the pivot mechanisms 5 into their unlocked position.

Figure 6:
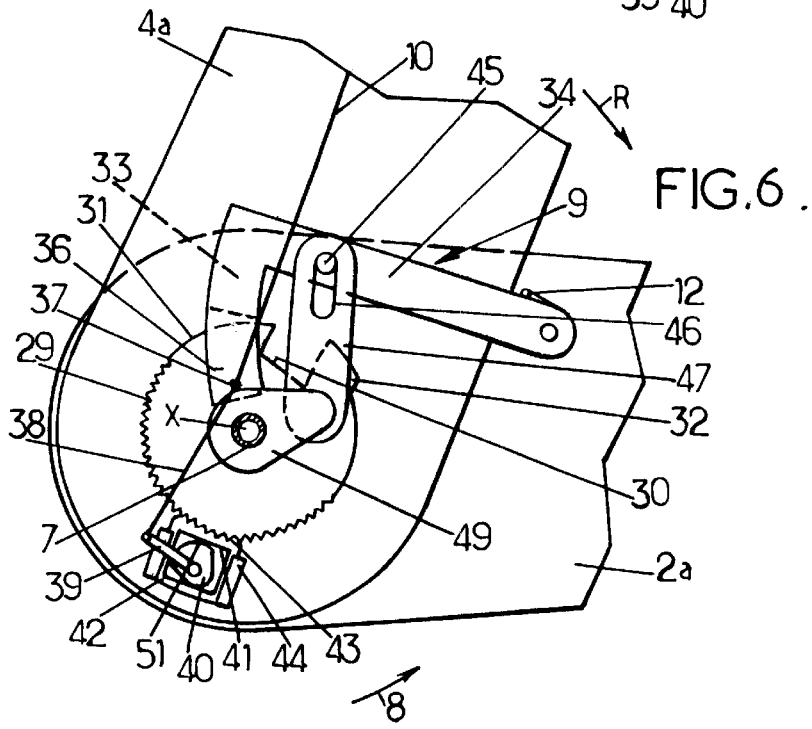

Advantageously, as illustrated in FIG. 6, when the indexing bearing plate 42 is moved to mesh with the teeth 29 of the indexing plate, a circular surface 51 of the cam 40, centered on the axis Y, bears against the side of the window 41 of the bearing plate which is oriented towards said teeth 29: consequently, even after the bearing plate 42 has engaged with the teeth 29, the lever 34 can continue to pivot under the action of the lever 11 until the hook 33 is released from the indentation 30 of the indexing plate. During this displacement, the cam 40 continues to pivot but this pivoting motion does not affect the position of the indexing bearing plate 42, since it is the circular surface 51 of the cam 40 which is then acting on this bearing plate. Furthermore, during said displacement, the linking bar 7 continues to pivot in the angular direction 8 until the two pivot mechanisms 5 are released.

The backrest 4 then pivots forward in the direction R under the action of the user and/or under the action of resilient means (not illustrated), as far as the folded down position illustrated in FIG. 6.

Once the backrest 4 has started to pivot forwards, the lever 34 remains in its lifted position or operating position because the hook 33 of this lever moves into abutment against the guide surface 31 of the indexing plate.

As a result, when the user puts the backrest 4 back up, the hook 33 slides against the guide surface 31 until it abuts against the stop finger 32 of the indexing plate and locates in the indentation 30 again under the action of the spring 12. The indexing bearing plate 42 then returns to its non-operating position and the two pivot mechanisms 5 return to their locked state under the action of their internal springs 24, driving the linking bar 7 with them so that the indexing mechanism 9 returns to its position of normal usage illustrated in FIGS. 4 and 5, the backrest 4 in turn being disposed in the last angular position adjusted by the user.

Figure 7:
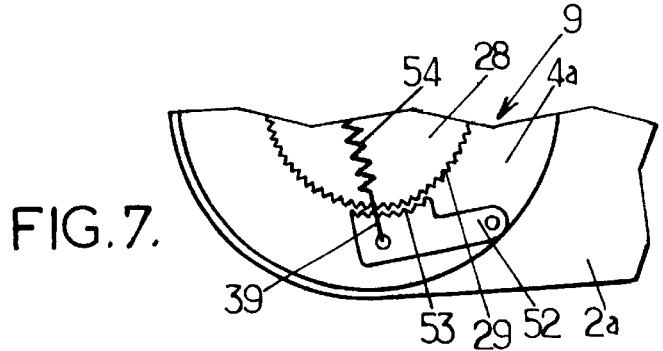
FIG. 7 is a partial view similar to that of FIG. 5, showing a second embodiment of the invention.

In a different embodiment illustrated in FIG. 7, the indexing bearing plate 42, the cam 40 and the lever 39 could be replaced by a simple lever 52 mounted so as to pivot on the frame 4a of the backrest and having teeth 53 at its free end arranged facing the teeth 29 of the indexing plate. This being the case, the cable 39 (replaced by a rigid rod, as is the case) must be provided with a spring 54 so that the length of said cable 39 (or said rod) can be varied to allow the teeth 29 and 53 to mesh before the hook 33 has been fully released and the pivot mechanisms unlocked on the one hand, and, on the other, to allow the backrest 4 to be folded down whilst holding the teeth 53 engaged with the teeth 29.

The spring 54 is designed so that it does not place the teeth 53 in engagement with the teeth 29 in the non-operating position.

To this end, the spring 53 may be long enough so that it does not become taut when the indexing mechanism is in the non-operating position or alternatively said spring is then maintained as an extension by a rigid stop member (not illustrated) dimensioned so that the teeth 53 remain spaced back from the teeth 29 in said non-operating position.

We claim:

1. A vehicle seat comprising:

first and second seat elements mounted so that one pivots relative to the other about an axis of rotation, at least one pivot mechanism which comprises a locking device displaceable between a locked position preventing relative pivoting movement between the first and second seat elements, and an unlocked position allowing a free pivoting movement between the first and second seat elements, said locking device being controlled by a first operating member which can be operated by a user, said first operating member being biased towards a non-operating position in which said first operating member places the locking device in its locked position, and the first operating member being displaceable in an angular operating direction towards an operating position in which said first operating member places the locking device in its unlocked position, the non-operating and operating positions of the first operating member being fixed relative to the first seat element, and an indexing mechanism which is displaceable between a non-operating position in which said indexing mechanism is designed not to impair the relative pivoting action of the first and second seat elements, and an operating position in which said indexing mechanism is designed to:

allow a free pivoting movement of the second seat element relative to the first seat element, in a first angular direction from the last relative position of adjustment of these two seat elements, then allow a free pivoting movement of the second seat element relative to the first seat element in a second angular direction opposite the first angular direction as far as said last relative position of adjustment of these two seat elements, the indexing mechanism being controlled by a second operating member which can be operated by a user, said second operating member being biased towards a non-operating position in which said second operating member places the indexing member in its non-operating position, the second operating member being displaceable to an operating position in which said second operating member places the indexing mechanism in its operating position, wherein the locking device provides a link between the first and second seat elements independently of the indexing mechanism, wherein the indexing mechanism comprises:

an indexing plate independent of the locking device, said indexing plate being mounted so as to pivot freely about the axis of rotation independently of the first and second seat elements, a first checking member independent of the locking device, said first checking member being linked to the second operating member and to the first seat element so that it can be displaced relative to said first seat element following the second operating member, said first checking member co-operating with the indexing plate in order to lock said indexing plate relative to the first seat element when the second operating member is in its non-operating position, and the first checking member allowing the indexing plate to pivot relative to the first seat element about the axis of rotation when said second operating member is in its operating position, and a second checking member independent of the locking device, said second checking member being linked to the second operating member and to the second seat element so that said second checking member can be displaced relative to said second seat element following the second operating member, said second checking member co-operating with the indexing plate in order to lock said indexing plate relative to the second seat element when the second operating member is in its operating position, and the second checking member allowing the indexing plate to pivot about the axis of rotation relative to the second seat element when said second operating member is in its non-operating position, and wherein the first and second operating members are linked to one another by a lost motion mechanical link which is designed:

to leave the second operating member in its non-operating position when acting on the first operating member by displacing it into its operating position, and to drive the first operating member from its non-operating position into its operating position when the second operating member is acted on by displacing it from its non-operating position into its operating position.

2. A seat as claimed in claim 1, in which the indexing mechanism comprises:

an indentation in which the first checking member engages when said first checking member is in its non-operating position, and a circular guide surface centered on the axis of rotation, on which the first checking member slidably bears when the indexing mechanism is in its operating position and the second seat element has been displaced in the first angular direction relative to the first seat element from the last adjusted relative position.

3. A seat as claimed in claim 2, in which the indexing plate also has a stop which is adjacent to the indentation of said indexing plate and which is disposed in the first angular direction relative to said indentation so as to allow the second seat element to pivot relative to the first seat element only in said first angular direction from said last adjusted relative position of these two seat elements when the indexing mechanism is in its operating position and then to check the relative pivoting movement between the two first and second seat elements in the second angular direction when the first seat element has been returned to its last adjusted position relative to the second seat element.

4. A seat as claimed in claim 2, in which the first checking member is a hook joined to an operating lever which constitutes the second operating member and which is mounted on the first seat element so as to pivot about a pivot axis parallel with said axis of rotation, the indentation and the guide surface of the indexing plate being radially oriented towards the exterior relative to the axis of rotation.

5. A seat as claimed in claim 4, in which the first operating member is mounted so as to pivot about the axis of rotation and is joined to an operating lever which is in turn pivotally mounted on a linking rod joined with a clearance to the operating lever, the non-operating positions of the first operating member and the operating lever being such that said clearance is picked up in a direction corresponding to the displacement of the operating lever from its non-operating position into its operating position when the indexing mechanism is in its non-operating position.

6. A seat as claimed in claim 4, in which the second checking member is coupled with the operating lever by a coupling member joined to said operating lever so as to pivot at a fixing point which is located substantially on the axis of rotation when the indexing mechanism is in its non-operating position.

7. A seat as claimed in claim 4, in which the operating lever is linked to a manual operating member accessible to a user, by a coupling member which is in turn linked to said operating lever so as to pivot at a fixing point which is located substantially on the axis of rotation when the indexing mechanism is in its non-operating position.

8. A seat as claimed in claim 1, in which the second checking member is an indexing bearing plate controlled by a cam mechanically coupled with the second operating member, this cam being mounted so as to pivot on the second seat element about a pivot axis parallel with said axis of rotation, said cam having a circular operating surface centered on said pivot axis, which operating surface holds the indexing bearing plate locked against the indexing plate within a certain angular pivoting range of the cam when the second operating member is in its operating position.

9. A seat as claimed in claim 1, in which the second checking member is directly coupled with the second operating member by a resilient link.

10. A seat as claimed in claim 1, in which the first and second seat elements are a seat part and a backrest.

* * * * *